United States Patent [19]

Murray

[11] 4,237,255

[45] Dec. 2, 1980

[54] SUSPENSION STABILIZER FOR P-METHYLSTYRENE SUSPENSION POLYMERIZATION

[75] Inventor: James G. Murray, East Brunswick, N.J.

[73] Assignee: Mobil Oil Corporation, New York, N.Y.

[21] Appl. No.: 108,926

[22] Filed: Dec. 31, 1979

[51] Int. Cl.$^3$ .................................................. C08F 2/20
[52] U.S. Cl. .................................... 526/201; 525/334; 525/346
[58] Field of Search ............................................ 526/201

[56] References Cited

U.S. PATENT DOCUMENTS 3,770,712  11/1973  Schwab .................................. 526/201

Primary Examiner—Stanford M. Levin
Attorney, Agent, or Firm—Charles A. Huggett; Hastings S. Trigg

[57] ABSTRACT

In the aqueous suspension polymerization of p-methylstyrene, in which a difficultly soluble phosphate is used as a suspension stabilizer, the improvement which comprises adding to the aqueous suspension, as an extender, sulfonated poly(p-methylstyrene).

1 Claim, No Drawings

SUSPENSION STABILIZER FOR P-METHYLSTYRENE SUSPENSION POLYMERIZATION

BACKGROUND OF THE INVENTION

1. Field of the Invention

This invention is directed to an improved suspension system for the polymerization of p-methylstyrene. It is more particularly concerned with a novel extender for suspension polymerization of p-methylstyrene.

2. Description of the Prior Art

As is well known to those familiar with the art, bead-shaped polymeric materials are generally produced in suspension polymerization. In such polymerization, vinyl monomers are suspended or dispersed in an aqueous medium in the presence of a suspension stabilizer and a polymerization initiator. The suspension stabilizer acts to prevent undesirable agglomeration of the polymerizing monomer and produce high molecular weight polymer in bead form. Instable dispersions result in agglomeration of the polymeric material into large masses.

Well known suspensions stabilizers that are widely used are the difficultly soluble phosphates, such as calcium, strontium, and magnesium phosphates. While under certain conditions these difficultly soluble phosphates serve to stabilize suspensions, they are erratic in behaviour. Various materials have been proposed that function as an auxiliary or "extender" for the difficultly soluble phosphate to increase its effectiveness as a suspension stabilizer. The anionic surface active agents must be used in carefully controlled amounts to avoid adverse effects. In addition, the range of utilizable concentrations is very narrow, making it difficult to follow the commercial practice of varying the polymer bead size by varying the amount of anionic surface active agent. Another proposed type of extender is a soluble salt of alkyl phosphoric acid.

Insofar as is now known, the extenders used in suspension system of this invention, i.e., sulfonated poly(p-methylstyrene), have not been proposed. Surprisingly, the suspension system of this invention appears to be specific for polymerization of p-methylstyrene. Attempts to use it in suspension polymerization of styrene resulted in collapse of the suspension.

SUMMARY OF THE INVENTION

In general, this invention provides, in the aqueous suspension polymerization of p-methylstyrene, in which a difficultly soluble phosphate is used as a suspension stabilizer, the improvement which comprises adding to the aqueous suspension, as an extender, sulfonated poly(p-methylstyrene).

DESCRIPTION OF SPECIFIC EMBODIMENTS

The monomer used in the process of this invention is p-methylstyrene. It is within the contemplation of this invention to use mixtures of methylstyrene rich in p-methylstyrene. Such mixtures contain at least 95 weight percent, preferably 97-99 weight percent, p-methylstyrene and less than 0.1 weight percent o-methylstyrene, with the balance being m-methylstyrene. A typical mixture contains, by weight, about 95 percent p-methylstyrene, and 5 percent m-methylstyrene, and about 0.5 percent o-methylstyrene. The mixtures are obtained by catalyst dehydrogenation of the mixtures of ethylmethyl benzene isomers described in U.S. Pat. No. 4,086,287 to which reference is made.

Using the improved suspension system of this invention, it is possible to use weight ratios of monomer to water of between about 60:40 and about 30:70. Preferably, optimum efficiency appears to occur at a 50:50 weight ratio.

"Difficultly soluble" phosphates are those phosphates which are not classifiable as water-soluble phosphates. The term "difficultly soluble" includes in its scope the terms "soluble," "very slightly soluble" and "slightly soluble," given in Hackh's Chemical Dictionary, third edition, page 787; and is intended to mean that more than 100 parts by weight of water are required to dissolve one part by weight of phosphate. In all cases in the practice of this invention, there should be enough phosphate present to have undissolved phosphate particles in the suspension system. The base or metal component of these phosphates may be any metal whose carbonate is also difficultly soluble in water. Thus, the metal may be calcium, barium, strontium, magnesium, aluminum, zinc, cadmium or iron, all of which give difficultly soluble phosphates.

Phosphates of the type described above as suitable for the practice of the invention may be prepared by precipitation methods. For example, metathetic or double decomposition reactions may be used to obtain precipitates of difficultly soluble phosphates, such as the reaction of ortho-phosphoric acid with an appropriate oxide or base, for example, with calcium oxide, or the reaction of a water-soluble salt of ortho-phosphoric acid with an appropriate salt or base, for example, trisodium phosphate with calcium chloride. Phosphates having the desired proportions of three or more equivalents of metal or base for each phosphate group may be obtained by the use of stoichiometric proportions in the double decomposition reactions.

Depending upon the particular conditions employed in the preparation of phosphates for the practice of the invention, a variety of differently constituted products may be obtained. These include the normal ortho phosphates which contain two phosphate groups per molecule such as tricalcium phosphate, its hemi-hydrate $2Ca_3(PO_4)_2.H_2O$, which is believed by some to be the salt, $Ca_3H_2P_2O_9$, of the diatomic acid, $H_8P_2O_9$, which contains the equivalent of two phosphate groups per molecule, and other hydrates, as well as such preferred phosphates as the hydroxy apatites, such as hydroxy apatite (calcium hydroxy hexaphosphate) $3Ca_3(PO_4)_2.Ca(OH)_2$, which contains the equivalent of six phosphate groups per molecule, and like phosphates having an apatite lattice. However constituted, the phosphates used in the practice of the invention are derivatives of ortho-phosphoric acid even though, in a strict sense, they may not be ortho-phosphates, but may more properly be considered as salts of those phosphoric acids which have at least as much water of constitution as ortho-phosphoric acid, and in which salts at least three equivalents of base are associated in the compounds for each phosphate group.

Where colorless beads are desired, the use of achromatic or colorless phosphates is preferred. These phosphates are obtained with metals having colorless oxides such as aluminum, magnesium, calcium, barium, strontium, zinc and cadmium.

The amount of phosphate suspension stabilizer used can be varied widely, according with the activity of the stabilizer, the size of beads desired, and the amount of extender used. Generally, the amount will be between about 0.05% and about 5% or more of the weight of the total suspension, and preferably between about 0.1% and about 1%.

The extender used in this invention is sulfonated poly(p-methylstyrene). The monomer utilizable is that described hereinbefore. The polymerization reaction to prepare poly(p-methylstyrene) is carried out by using methods and catalysts well known in the art for polymerizing styrene. The reaction can be carried out in solution, bulk, emulsion, or suspension. In general, the poly(p-methylstyrene) will have a molecular weight in the order of between about 5,000 and about 300,000.

Sulfonation of the polymer can be effected by known methods using chlorosulfonic acid, sulfonyl chloride, or oleum. Generally, the reaction is carried out in a suitable solvent, such as methylene chloride, and at ambient temperatures, although warming can be used to speed up the reaction. Preferably, the poly(p-methylstyrene) is sulfonated to the extent of 0.1% to 15% of sulfonic acid groups per monomer unit.

The polymerization initiators should be soluble in the p-methylstyrene. Thus, non-limiting examples of catalysts are benzoyl peroxide, acetyl peroxide, ditertiary-butyl peroxide, lauryl peroxide, t-butyl perbenzoate, t-butyl peroxypivalate, t-butyl peroctoate, t-butyl peroxyisobutyrate, t-butyl peracetate, and combinations of these.

The amount of catalyst may be varied according to the nature and activity of the particular catalyst, according to the nature of the particular polymerizable material, and according to the product desired, as is well known in the art.

It is to be noted that the suspension polymerization system can contain, usually in the organic (i.e., monomer) phase various dissolved organic substances, including lubricants (for subsequent molding operational), anti-oxidants, dyes, and chain transfer agents. Such materials, of course, are incidental to the suspension polymerization system of this invention and, in general, have moderate or no influence on particle size.

Lubricants can be of varied types, including mineral lubricating oils, fatty esters, such as butyl stearate, and long chain fatty acids, such as stearic and oleic acids. The anti-oxidants, well-known in the art, can include butylated hydroxy toluene, i.e., 2,6-di-t-butyl-p-cresol.

As generally conducted, the polymerization is carried out at temperatures of about 194° F. (90° C.). The suspension system of this invention, however, is stable at temperatures of as high as 300° F. The advantages of higher polymerization temperature are an accelerated polymerization rate, complete conversion of monomer, and elimination of residual peroxide.

EXAMPLE

A sample (11.8 g.) of poly(paramethylstyrene) (PPMS), which had been prepared by anionic polymerization and which had a nominal molecular weight of 45,000, was dissolved in 106 g. of methylene chloride and reacted with 1.6 g. of chlorosulfonic acid by stirring overnight at room temperature. The resulting mixture was then stirred for several hours with a few drops of water to hydrolyze any chlorosulfonic acid groups.

The resulting product was used as an extender for a paramethylstyrene suspension polymerization. A standard polymerization of paramethylstyrene was carried out by agitating 25 g. of paramethylstyrene containing 0.05 g. of benzoylperoxide and 0.04 g. of t-butylperbenzoate together with 25 g. of water containing 0.25 g. of tricalcium phosphate in a nitrogen atmosphere for 18 hours at 92° C. Varying amounts of different suspension extenders were added to this standard recipe as indicated in the following Table.

Table

| Run No. | Suspension Extender | Amount, ppm | Results |
|---|---|---|---|
| 1 | Potassium Persulfate | 80 | Suspension Collapse |
| 2 | Potassium Persulfate | 160 | Suspension Collapse |
| 3 | Sodium Alkyl Aryl Sulfonate | 69 | Suspension Collapse |
| 4 | Sodium Alkyl Aryl Sulfonate | 46 | Beads |
| 5 | Sodium Alkyl Aryl Sulfonate | 23 | Suspension Collapse |
| 6 | Sulfonated PPMS | 10 | Beads |
| 7 | Sulfonated PPMS | 100 | Beads |

From the data in the Table, it will be noted that potassium persulfate was not effective as an extender. Sodium alkyl aryl sulfonate, a typical anionic surfactant, has a limited range of utility, as was indicated hereinbefore. It was effective at 46 ppm, but not at the higher and lower concentrations, 69 and 23 ppm respectively. On the other hand, the sulfonated poly(p-methylstyrene) was effective at concentrations as low as 10 ppm and as high as 100 ppm, thus being effective over a wide concentration range. The sulfonated PPMS was not found to be effective in the suspension polymerization of styrene.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claim.

What is claimed is:

1. In the aqueous suspension polymerization of p-methylstyrene, in which a difficultly soluble phosphate is used as a suspension stabilizer, the improvement which comprises adding to the aqueous suspension, as an extender, sulfonated poly(p-methylstyrene).

* * * * *